United States Patent

Birnbrich et al.

[11] Patent Number: 6,107,406
[45] Date of Patent: Aug. 22, 2000

[54] POLYOLEFINE PARTS AND FOILS WITH PERMANENTLY IMPROVED SURFACE PROPERTIES

[75] Inventors: Paul Birnbrich, Solingen; Ulrike Driessen, Kempen; Manfred Gorzinski; Herbert Fischer, both of Duesseldorf; Martin Schaefer, Krefeld; Joerg-Dieter Klamann, Bremerhaven, all of Germany

[73] Assignee: Henkel Kommanditgesellschaft auf Aktien, Germany

[21] Appl. No.: 09/051,274

[22] PCT Filed: Sep. 25, 1996

[86] PCT No.: PCT/EP96/04179

§ 371 Date: Jun. 5, 1998

§ 102(e) Date: Jun. 5, 1998

[87] PCT Pub. No.: WO97/12694

PCT Pub. Date: Apr. 10, 1997

[30] Foreign Application Priority Data

Oct. 4, 1995 [DE] Germany ............... 195 36 961

[51] Int. Cl.[7] .................... C08L 23/02; C08L 21/00; C08K 5/09
[52] U.S. Cl. .................. 525/227; 525/242; 525/244; 525/245; 428/516; 428/483
[58] Field of Search .................. 525/242, 244, 525/245, 222, 227, 309; 428/516, 483

[56] References Cited

U.S. PATENT DOCUMENTS

| | | | |
|---|---|---|---|
| 3,314,813 | 4/1967 | Maxion | 117/12 |
| 3,396,137 | 8/1968 | Wharton | 260/32.6 |
| 3,944,511 | 3/1976 | Taylor | 525/340 |
| 4,144,214 | 3/1979 | Corbacella | 260/23 H |
| 5,126,971 | 6/1992 | Lin et al. | 365/171 |
| 5,286,525 | 2/1994 | Chen et al. | 427/256 |
| 5,393,814 | 2/1995 | Chen | 524/219 |
| 5,476,905 | 12/1995 | Schwager et al. | 525/301 |

FOREIGN PATENT DOCUMENTS

| | | |
|---|---|---|
| 898 893 | 5/1984 | Belgium . |
| 0 311 723 | 4/1989 | European Pat. Off. . |
| 0 338 393 | 10/1989 | European Pat. Off. . |
| 0 402 100 | 12/1990 | European Pat. Off. . |
| 0 467 178 | 1/1992 | European Pat. Off. . |
| 050 947 | 1/1966 | Germany . |
| 16 94 183 | 8/1971 | Germany . |
| 27 29 886 | 4/1978 | Germany . |
| 34 90 656 | 4/1989 | Germany . |
| 63/141675 | 6/1988 | Japan . |
| 03 222 181 | 1/1991 | Japan . |
| 1 059 973 | 2/1967 | United Kingdom . |
| 1 183 763 | 3/1970 | United Kingdom . |
| 2 162 853 | 2/1986 | United Kingdom . |
| WO93/12171 | 6/1993 | WIPO . |

*Primary Examiner*—James J. Seidleck
*Assistant Examiner*—Olga Asinovsky
*Attorney, Agent, or Firm*—John E. Drach; Daniel S. Ortiz

[57] ABSTRACT

Polyolefine-based mouldings and foils contain internal bonding additives which are enriched by migration at the plastic surface and which have their molecular structure bonding substituents of higher polarity on an oleophilic hydrocarbon radical. At least one part of these internal additives is hardened via its hydrocarbon radicals in the area of the plastic surface and prevented from further migrating, and so permanent adhesive bondings and/or coatings of the polyolefine surface may be obtained without additional preliminary treatments. Also disclosed is a process for furnishing solid polyolefine surfaces with such adherence-improving, immobilised additive (mixtures), and other auxiliary agents used for that purpose.

19 Claims, No Drawings

POLYOLEFINE PARTS AND FOILS WITH PERMANENTLY IMPROVED SURFACE PROPERTIES

BACKGROUND OF THE INVENTION

Molded workpieces of any three-dimensional form, including fibers and filaments, and films based on polyolefins, more particularly polyethylene and polypropylene, are used on a very wide scale in practice. An important problem area here is improving the surface properties of these structurally nonpolar hydrocarbon components. Thus, the inadequate adhesion of coatings, adhesives, printing inks and the like is a central problem which has remained unsolved for decades despite numerous attempts to find a solution.

A comprehensive account of the various proposals which have been made with a view to solving the stated problem can be found, for example, in EP 0 311 723. In the interests of simplicity, reference is hereby made to the disclosure of this document.

The concept of improving adhesion to hard polyolefin surfaces in reality encompasses an extremely broad range of very different technical requirements. This will immediately become clear from the following comparison: improving the adhesion of a printing ink to polyolefin films cannot be compared with improving the adhesive bonding to a rigid polyolefin molding of solid workpieces of metal or other plastics with no risk of adhesive failure when mechanical forces are applied to the bond. Of considerable practical significance moreover is the dependence on time of the adhesive strength established, the notion of dependence on time in turn encompassing two different parameters. The first concerns the time interval elapsing between production of the polyolefin-based molding and its subsequent coating or bonding. The second quality parameter concerns maintenance of the adhesiveness values initially established in the bonded workpiece or coated material over the duration of its practical use which, as well known, can involve very long periods of time, for example of several years. What is required in practice for a number of applications of the technology under discussion here is the possibility of establishing high-strength bonds by coating and/or application of adhesives using standard auxiliaries up to and including resistance to adhesive failure with no dependence on time between production and finishing of the polyolefin-based molding on the one hand and its coating and/or bonding on the other hand, the strength values once established remaining intact for virtually indefinite periods.

The teaching according to the invention starts out from this objective. In addition, the invention seeks to create the possibility of not necessarily having to use past technical proposals for solving the problem discussed in the foregoing. Thus, it is known that the adhesive strength of polyolefin-based materials can be substantially increased by processing high molecular weight copolymers containing coupling polar groups in the polymer structure together with the nonpolar polyolefin and/or by imparting the permanent high polarity required to the nonpolar polyolefin by grafting on polar elements, cf. for example the disclosures of DE 34 90 656, EP 0 467 178 and JP 222 181.

Numerous proposals from the prior art are also concerned with incorporating comparatively low molecular weight mixture components containing polar substituents in the polyolefin-based polymer. The proposals in question are mainly concerned with improving the adhesion of, above all, printing inks to polyolefin films, i.e. with fulfilling a relatively moderate technical requirement. The following documents are cited purely by way of example as representative of the extensive prior-art literature:

DE-OS 27 29 886, EP 0 402 100, U.S. Pat. Nos. 3,396, 137, 5,286,525 and 5,393,814 and JA 0 54 331. The cited documents are mainly concerned with improving the adhesive strength of polyolefin films with respect to the application of printing inks. The use of known surface treatments, more particularly corona or plasma pretreatment, is also prescribed.

DD-PS 50 947 is concerned in its introduction with proposals to incorporate low molecular weight additives containing polar substituents in polyolefin-based molding compositions. Reference is made here to the above-mentioned fact that, where low molecular weight internal additives such as these are incorporated, the corresponding polyolefin moldings show decreasing strength values and hence deteriorations in their mechanical properties after prolonged exposure to mechanical forces.

The reason for this unwanted development of the property spectrum of correspondingly finished materials lies in the known migration of low molecular weight components containing polar substituents in admixture with the polyolefin. Even if these low molecular weight additives are uniformly incorporated, the effect known as blooming-out occurs. During storage of the polymeric molding containing low molecular weight components or the corresponding film, the low molecular weight additives migrate outwards to the surfaces of the molding. Ultimately, even the hydrocarbon residues of the additives separate from their physical mixture with the polyolefin substance. The additive then exists as a liquid or solid film on the polyolefin surface. This naturally has a critical influence on the increasing deterioration in the adhesion values in the corresponding composite material. For comparatively slight stressing, for example the printing of polyolefin films, the immediate result does not have to be technical uselessness, especially since other properties of the polyolefin surface, for example slip, can be improved by blooming out. As mentioned, however, this phenomenon of migration and blooming out is unacceptable for the establishment of high-strength bonds and/or coatings with foreign materials without any dependence on time.

DETAILED DESCRIPTION OF THE INVENTION

The teaching of the invention as described in the following is based on this knowledge of the relevant expert only briefly documented in the foregoing. The problem addressed by the present invention was to utilize this technical effect of the migration of comparatively low molecular weight components after their incorporation in a high molecular weight polyolefin-based polymer material and, by suitably modifying this process, to secure the required objective of a permanent improvement in adhesion to polyolefin surfaces compared with bonds and coatings involving standard auxiliaries, more particularly corresponding catalyzed resins or catalyzed lacquers. More particularly, the problem addressed by the invention was to establish high-strength bonds which would rule out unwanted adhesive failures and which would ensure that the adhesive joint could only be destroyed by cohesive failure or by combined cohesive/adhesive failure.

In a first embodiment, therefore, the present invention relates to polyolefin-based moldings and films containing coupling internal additives which are concentrated on the plastic surface through migration (blooming) and which, in their molecular structure, contain coupling substituents of high polarity on an oleophilic hydrocarbon residue. These comparatively low molecular weight additives capable of migration are also referred to hereinafter as "additive (I)". The term "molding" is meant to be broadly interpreted and encompasses both corresponding rigid elements (for example sheets) and fibers and/or filaments or workpieces produced using them.

The teaching according to the invention in this embodiment is characterized in that at least such a percentage of these internal additives is fixed in the plastic surface and immobilized against further migration by its hydrocarbon residues that permanently adhesive layers and/or coatings can be applied to the polyolefin surface treated in accordance with the invention without any need for additional pretreatment thereof.

In another embodiment, the invention relates to a process for treating hard polyolefin surfaces having substituents of high polarity and, if desired, chemical reactivity to corresponding reactive groups for improving the adhesion of coating materials, more particularly lacquers and/or adhesives, to the polyolefin surface using coupling internal additives in the polyolefin, In this embodiment, the teaching according to the invention is characterized in that coupling internal additives (I) capable of migration, i.e. characterized by the blooming effect, are incorporated in the polyolefin for processing and, after at least partial migration to the surface, are immobilized there to such an extent that improvement of the adhesion of subsequently applied coatings and/or bonds is guaranteed largely independent of time. The notion of a guarantee with no dependence on time concerns both the time elapsing between production of the particular polyolefin-based molding and its subsequent coating with lacquers or adhesives and the period of use of the multicomponent product produced by lacquering or coating with adhesives.

Finally, the invention relates to additive mixtures for solid plastics based on polyolefins, more particularly polyethylene and or polypropylene, which—as an internal additive—improve coating with adhesives or lacquering behavior or generally adhesion to the polyolefin surface. Corresponding particulars are given in the following.

The technical solution to the complex problem outlined above of providing a permanent and optimized improvement in the adhesion of virtually any materials to the surfaces of polyolefin-based plastics essentially makes use of the known above-mentioned effect of separation by migration of comparatively low molecular weight constituents which are intensively mixed with polyolefins, for example during their processing by shaping. In this connection, the teaching according to the invention seeks to influence the chemical character of these low molecular weight mixture components migrating outwards from the olefin base in such a way that not only is migration as such guaranteed. An essential step of the teaching according to the invention is to fix these internal additives in the plastic surface through their hydrocarbon residues and hence to immobilize them against further migration. The following technical result can thus be secured: functional groups of high polarity or even with reactivity to reactive components from the coating compositions subsequently applied can collect at the surface of the polyolefin molding in a predetermined manner in regard to type and concentration. These functional groups are an exposed constituent of the internal additive (I) which, with its hydrocarbon residue, remains in the molecular structure of the polyolefin, again in a predetermined manner, and hence permanently unites the additive (I) with the polyolefin base.

The definition of the coupling internal additives (I) is of considerable importance to the practical application of the working principle according to the invention. The following observations apply in this regard. These additives, which are incorporated in the polyolefin-based plastic in comparatively small quantities, are characterized by low molecular weights in comparison with the polymer components. An upper limit to the molecular weight of suitable internal additives (I) is 5,000 D (Dalton), preferably at most about 3,000 D and more preferably at most about 1,000 D. Expression of the molecular weight in "Daltons" is known to be the definition (here the definition of the upper limit) as an absolute molecular weight. By comparison therefore with the polyolefins with their molecular weights in the millions, comparatively low molecular weight components are present here. Lower limits to the molecular weight of the internal additives (I) are about 70 to 100 D, preferably 150 to 180 D and more preferably about 200 to 300 D.

The chemical structure of the coupling internal additives (I) is another important factor. The following observations apply in this regard. The chemical structure of the additives is generally a combination of a suitable hydrocarbon-based oleophilic basic molecule which has one or more substituents of high polarity. Highly polar substituents such as these are formed in known manner by molecular constituents containing hetero atoms, particular significance being attributed in this regard to the hetero atoms O, N and/or halogen for forming the highly polar functional group(s).

In one particularly important embodiment of the teaching according to the invention, the oleophilic hydrocarbon residue of the coupling internal additives is additionally characterized in that at least partly olefinically unsaturated elements are present therein. Preferred additives (I) according to the invention are those which, in their unreacted state, have iodine values of at least about 10, preferably of at least about 30 to 40 and more preferably of at least about 45 to 50. As explained in detail hereinafter, both mono-olefinically unsaturated hydrocarbon residues and polyolefinically unsaturated hydrocarbon residues may be present in the additives (I) used in accordance with the invention. Combinations of several corresponding compounds are also important auxiliaries for the purposes of the teaching according to the invention. The particular iodine values of the additives (I) used may assume values above 80 to 90 and, more particularly, values above 100. Highly unsaturated additive components with iodine values of up to about 200 or even higher, for example in the range from 120 to 170, are auxiliaries in the context of the teaching according to the invention which, on the one hand, can be immobilized particularly effectively in the outer region of the solid polyolefin molding; on the other hand, these highly unsaturated additives are generally compounds which flow at room temperature or at slightly elevated temperatures, for example at temperatures of up to 40 to 45° C. Where such components are used, the migration step crucial to application of the working principle according to the invention is facilitated just as much as immobilization of the migratable additive components in the outer regions of the polyolefin molding.

So far as the three-dimensional structure of their hydrocarbon residue is concerned, the internal additives (I) may be both linear and branched and/or may have a cyclic structure. The presence of adequate olefinically unsaturated elements also provides for the permanent incorporation of linear additives (I) in the polyolefin surface or outer surface. Heavily branched and/or cyclic structures of the hydrocarbon residue can trigger an additional blockage of the migration effect, particularly in the uppermost layers of the polyolefin, so that the additives in question are also physically immobilized in the outer surface of the polyolefin-based molding. Particulars of this will be given in the following.

Basically, suitable substituents of high polarity are the many functional groups which are distinguished in particular by a content of hetero atoms and preferably by a content of O, N and/or halogen. Residues from the classes of carboxyl, hydroxyl, amino, oxazoline, epoxide and/or isocyanate groups and/or corresponding derivatives are mentioned purely by way of example. Such derivatives include, for example, ester groups, ether groups, amide groups/alkanolamine and/or alkanolamide groups.

Certain individually selected additives of the type in question and mixtures of several corresponding auxiliaries may be used as the additive (I). The adhesive strength of the end product can be influenced in a predetermined manner by suitably selecting the coupling substituents of high polarity for the particular auxiliaries of this class that are added. However, mixtures of the type in question are also corresponding mixtures which, so far as their functional group is concerned, may be assigned to a certain a sub-class, i.e. for example carboxyl groups as coupling substituents of high polarity, but which have different basic structures in their hydrocarbon molecule. It is known that corresponding mixtures are obtained in particular where mixtures of the type in question based on natural materials are used. For example, olefinically unsaturated fatty acid mixtures of vegetable and/or animal origin or derivatives thereof can be valuable additives of the type (I) for the purposes of the teaching according to the invention.

As well known to the expert, different improvements in adhesion can be expected in the subsequent coating step according to the particular groups of high polarity. Relevant specialist knowledge is applicable in this regard. However, particular significance is also attributed to the following possible variation of the teaching according to the invention:

Coating compositions, such as lacquers or adhesives, can embody the principle of purely physical drying. However, they are often used as reactive compositions which lead to molecular enlargement and hence to curing by reacting off in situ. Thus, in the adhesives field for example, polyurethane-based multicomponent adhesives or epoxy adhesives are known for their ability to form bonds of high strength. By suitably selecting the functional groups of high polarity fixed at the polyolefin surface in accordance with the invention, this component of the additives (I) can additionally react off at least partly with corresponding reactive components of the coating compositions or adhesives applied. This explains why carboxyl groups and/or hydroxyl groups can be particularly important as a constituent of the additives (I) according to the invention.

Another possibility for varying the composition of the additives (I) according to the invention lies in the number of functional substituents of high polarity in the particular hydrocarbon skeleton. Even one substituent of high polarity can lead to the required permanent and, at the same time, highly intensive increase in adhesion, particularly after adaptation of the type and quantity of functional groups available. In addition, it has been found that the presence of several such substituents of high polarity in the particular molecule of the additive (I) can be an important additional feature for increasing adhesive strength. Reference is made purely by way of example here to the class of so-called dimer fatty acids which, through dimerization of polyethylenically unsaturated fatty acids by Diels-Alder condensation, form a hydrocarbon skeleton of complex and branched structure which combines sufficient olefinic double bonds for reactive fixing in the polyolefin surface and, at the same time, two carboxyl groups per molecule unit. Dialkanol-amines containing at least partly olefinically unsaturated hydrocarbon residues or dialkanolamides of unsaturated fatty acids are highly effective adhesion promoters in the sense of the teaching according to the invention.

This applies in particular to the corresponding diethanol derivatives. This class includes, for example, oleic acid diethanolamide and linoleic acid diethanolamide. Expressly included in this connection are commercial products known to the expert, including the secondary components normally occurring therein. Examples of such commercial products are "Comperlan OD" (technical oleic acid diethanolamide) and "Comperlan F" (technical linoleic acid diethanolamide)—both known products of Henkel KGaA. However, compounds belonging to the group of sorbitan monoesters with, in particular, ethylenically unsaturated fatty acids also lead to optimal results in the context of the teaching according to the invention. The compounds specifically mentioned here are merely examples of the structure of particularly effective internal additives (I), on the basis of which a wide range of correspondingly effective additives can be selected with the aid of general specialist knowledge and used for the purposes of the teaching according to the invention.

A first aspect of the teaching according to the invention is concerned with the selection and determination of the coupling additives (I) according to molecule size and character of the various functional parts of the molecule. This determines the ability of the auxiliary uniformly incorporated in the polyolefin to migrate after production of the particular molding, for example by extrusion. The other complex of determining elements described in the following is important to the application of the teaching according to the invention. This other complex of determining elements comprises immobilization of the additives (I) concentrated in the surface of the plastic by chemical and, preferably, catalytically induced and/or supported reaction of reactive molecular constituents of the hydrocarbon residues of the additives (I) with enlargement of the molecule and/or at least partial fixing of these additives by physical inhibition of any further migration. The variant of reactive immobilization of the initially migratable additive molecule is discussed first.

The ability to migrate in the molded polyolefin material is critically influenced by the size of the additive molecule. Depending on additional physical parameters, migration is increasingly impeded with increasing individual (absolute) molecular weight so that, on reaching an adequate size, the molecule is immobilized in the intended place even though, basically, it retains it tendency towards further migration. The teaching according to the invention makes use of this. The coupling additives (I) are used in admixture with the polyolefin solid initially with a molecule size which allows the predetermined migration into the outer regions of the polymer material. In the embodiment under discussion, however, a chemical reaction of the migrating additives in this surface boundary zone is initiated or rather ensured by the use of suitable auxiliaries. The reason for this of course is that not only is atmospheric oxygen present at the outer surface of the plastic, the areas of plastic immediately adjacent the outer surface which are crucial to the teaching according to the invention also take up certain quantities of atmospheric oxygen by diffusion. A sufficiently olefinically unsaturated additive molecule can thus be oxidatively reacted off in known manner with enlargement of the molecule. Suitable coordination of the parameters to be taken into account here using general expert knowledge thus enables the object of the invention to be achieved, i.e. immobilizing initially migratable coupling additive molecules in this outer zone of the plastic molding with enlargement of the molecule in such a way that sufficient and predeterminable numbers of functional groups of high polarity are available for the external application of coating compositions and/or adhesives although the associated hydrocarbon residues of these additive molecules still remain thoroughly mixed with the polyolefin molecule either directly or indirectly through other additive molecules. Accordingly, the oligo or polymolecule of the coupling additive thus built up is able to perform its designated function of permanently improving adhesion and, at the same time, optimally increasing the improvement in adhesion.

The process sequence presented here as an example of the teaching according to the invention can be put into effect in various forms, some of which are described—again by way of example—in the following.

The internal coupling additives capable of reacting off, particularly in the presence of oxygen, are incorporated in the polyolefin-based plastic together with catalysts which promote reactive crosslinking at the surface of the plastic. Accordingly, at least partly olefinically unsaturated additives (I) may be used together with catalysts, for example based on transition metal salts. The catalytic curing of olefinically unsaturated organic components of comparatively low molecular weight using such transition metal salts is known to the expert, for example from the field of lacquers and coating compositions. The catalytically active transition metal salts are also known among experts as siccatives. Suitable siccatives are, for example, salts from the group consisting of Co, Zr, Fe, Pb, Mn, Ni, Cr, V and Ce. Even extremely low concentrations of such transition metal salts, for example in the lowermost ppm range or even far lower, show pronounced catalytic activity in accelerating the curing of olefinically unsaturated components by oxidatively reacting off in the presence of atmospheric oxygen with enlargement of the molecule. Although the teaching according to the invention uses this knowledge as basically intended, the expert is also presented with the opportunity for optimization in each particular concrete case, thus securing the desired objective of permanence and optimization of the improvement in adhesion without causing fundamental changes in the properties of the polyolefin-based material. The following additional considerations are relevant in this regard:

Recent works by relevant experts are concerned with the problem of making polymer materials based on polyolefins, more particularly polyethylene and/or polypropylene, which are non-degradable or not readily degradable by natural processes accessible to easier degradation under environmental conditions by addition of selected additives. This is of interest, for example, for agricultural films, cf. in this connection PCT publication WO 93/12171. This document describes efforts to make thermoplastic polymer compounds of the type with which the present invention is also concerned degradable into a brittle material under composting conditions, i.e. a relative humidity of at least 80% and a temperature of 60° C., over a period of 14 days by incorporating so-called auto-oxidative components together with predetermined quantities of selected transition metals in the high molecular weight polymer. According to the publication in question, suitable auto-oxidative components are, in particular, unsaturated fatty acids and esters thereof which are said to be added in quantities of 0.1 to 10% by weight, based on the mixture as a whole. At the same time, the salts of selected transition metals, i.e. salts of cobalt, manganese, copper, cerium, vanadium and iron, are used as catalysts to initiate the oxidation in quantities of 5 to 500 ppm of the transition metal. The use of antioxidants is also proposed in order to stabilize the polyolefin-based material during its period of use. Referring to the relevant prior art, the document in question states that these latest investigations have shown that the desired degradability of the polyolefin material can only be achieved by using the right type and quantity of transition metal catalyst.

The teaching according to the invention differs from this prior art as follows: the object of the teaching according to the invention is not to establish or modify the potential degradability of polyolefin-based moldings and/or films. On the contrary, the invention seeks to leave the basic polyolefin structure largely unchanged. Instead, the problem addressed by the present invention was to improve adhesion to the surfaces of polyolefin-based materials, i.e. to modify an important parameter which is not discussed at all in the last prior-art document cited above. The teaching according to the invention is based on the observation that this problem can be solved by fixing the coupling additive after it has migrated into the outer regions of the particular polyolefin-based molding. Where auxiliaries as defined in the disclosure of PCT WO 93/12171 are used in the practical application of the teaching according to the invention, oxidative degradation of the polyolefin in the context of the teaching of that document can be prevented from occurring in the multicomponent mixtures formulated in accordance with the invention by limiting the quantity in which the siccative based on the transition metals in question is used. In the Examples, it is shown that the fixing of the coupling additives which have migrated into the outer regions, as desired in accordance with the invention, is initiated where siccative contents well below 5 ppm are used. The siccative content can be reduced by several orders of magnitude below the lower limit of 5 ppm mentioned in the prior-art document in question without significantly limiting the desired improved in adhesion. In addition to and independently of this, the following observations apply in this regard:

The siccatives based on transition metals defined in the foregoing for the teaching according to the invention are more broadly defined than the specifically limited group of transition metals according to the teaching of the document under discussion. Moreover, the document in question states that only monocarboxylic acids and derivatives thereof are suitable as the auto-oxidative component whereas additives (I) which either contain several corresponding functional groups of high polarity on the molecule and/or which have a totally different structure or character are particularly suitable for the teaching according to the invention. However, the teaching according to the invention is not limited in its application to the use of siccatives in the form of the overlapping transition metal compounds. Working conditions and, in particular, initiators or catalysts which are completely free from transition metals or transition metal compounds of the type under discussion may be used to fix the migratable coupling additives (I).

However, even in cases where siccatives of the type mentioned above based on transition metal compounds are used, the teaching according to the invention—as explained—enables the improved adhesion required to be achieved without at the same time endangering the properties of the basic polymer material. One preferred embodiment is characterized by the use of the siccatives in combination with additives (I) selected from the class of diethanolamides of unsaturated fatty acids. As already mentioned, the diethanolamides are preferably used in technical quality. Suitable siccatives for use in accordance with the invention are, for example, organic compounds and, more particularly, corresponding carboxylic acid salts of the particular transition metals. The carboxylic acids may additionally be selected so that, by virtue of their molecular structure, they themselves become the coupling internal additive. However, taking into account the extremely small quantities of siccative required, this is merely a variant. Particularly useful siccatives can also be found in the class of relatively low saturated fatty acids, for example containing 6 to 12 carbon atoms in the fatty acid molecule. These siccative fatty acids may even be linear.

Whereas, in the hitherto described specific embodiment of the teaching according to the invention, the optionally catalytically controlled autoxidation of the migratable additives (I) with enlargement of the molecule at the plastic surface is the crucial immobilization step, the teaching according to the invention affords other possibilities for applying the stated principle. Thus, the hitherto specifically mentioned siccatives may be replaced or accompanied by other catalyst systems which in turn migrate into the outer regions of the polyolefin-based plastic molding where they initiate or secure the molecule-enlarging reaction of olefinically unsaturated internal additives (I) in the presence of atmospheric oxygen and/or through the use of additional auxiliaries. For example, the molecule-enlarging reaction can be initiated in known manner by the input of energy in the form of suitably selected high-energy radiation. Catalysts suitable for this purpose are known from the prior art and are not dependent on the use of transition metals of the class of siccatives described above. In this way, the problem addressed by the invention can be solved without having to use any metallic components.

In this connection, reference is made to another possible modification of the teaching according to the invention. In addition to the olefinic double bonds mentioned above, other structural elements of the additive molecule are basically suitable for a potential reaction of the additives (I) at the plastic surface. Thus, it is known that branched hydrocarbon residues can lead to structural units in the molecule which are also catalytically suitable for reacting off with enlargement of the molecule. Tertiary carbon atoms in the molecule structure are particularly appropriate in this regard. The modification of the teaching according to the invention under discussion here makes use of this well-known fact. In this case, too, an additive molecule which is now aliphatically saturated, for example, is first exposed to migration in the molded polyolefin material. Enlargement of the molecule then takes place in the outer regions of the molding through reaction of the above-mentioned functional elements of the additive molecule—again preferably under the effect of correspondingly selected catalytically active additives and/or additional energy supplied, for example, in the form of radiation. However, the teaching according to the invention differs in this case, too, from the known finishing of the polyolefin surface, for example by corona or plasma treatment. The working principle according to the invention achieves the high adhesive strengths required without having to resort to any such additional pretreatment steps. However, combination of the working principle according to the invention with known measures for increasing adhesion is not of course out of the question and falls within the scope of the teaching according to the invention.

In one important embodiment of the teaching according to the invention, the migratable coupling additives (I) are used together with another additive component which is referred to hereinafter as "additive (II)". This class of additives comprises relatively high molecular weight compounds containing olefinically unsaturated groups which are correspondingly limited in their mobility in the polyolefin-based plastic. Preferred additives (II) are corresponding oligomer or polymer components with molecular weights of up to about 1 million D, the lower limit to the molecular weight being freely selectable providing migration is adequately inhibited in the final polyolefin molding. Suitable lower limits for the molecular weight of the additives (II) are, for example, 10,000 D or lower, preferably 50,000 to 75,000 D or lower and more preferably at least 100,000 D. In this case, too, the potential mobility of the additive (II) in the solidified polyolefin molding can be additionally influenced through structural parameters, for example through a complex three-dimensional structure of the additive (II).

The additives (II) are preferably distributed at least substantially uniformly in the polyolefin polymer in the same way as the other additives hitherto described. However, the additive (II) largely retains its spatial distribution and association in the following migration step. In its/their subsequent fixing, the additive component(s) (I) can now be linked to the additive component(s) (II). It is clear that this can have a positive effect on the fixing of the coupling additive component(s) (I) desired in accordance with the invention.

In principle, the additive (II) may be selected from oligomer or polymer components of adequate molecular weight providing their molecular structure contains reactive ethylenic double bonds for potential linking of the additive component(s) (I). Unsaturated alkyd resins preferably with an oil length of 20 to 70% are mentioned purely by way of example. Other examples include butadiene derivatives, isoprene derivatives, allyl-containing polymers, unsaturated polyesters based on polybasic carboxylic acids and/or poly(meth)acrylates containing residues of unsaturated fatty alcohols.

Where the additives (I) and (II) are used together, they may be employed in quantity ratios (additive (I) : additive (II)) of 10:1 to 1:3 and preferably in quantity ratios of 8:1 to 1:1. In the important embodiments, therefore, additive (II) is generally used in a smaller quantity than or at most in the same quantity as additive (I). The additive mixtures are added to the polyolefin-based plastic in quantities of generally 0.01 to 10% by weight and preferably 0.1 to at most about 5% by weight and, more particularly, in quantities of at least 0.5 to 1 or 3% by weight, based on polyolefin-based plastic.

Taking into account the above-described embodiment in which siccatives are used as an additional catalytic aid for immobilizing the migratable additives (I), preferred mixtures of the additive types in question and the siccative are those which contain the individual components in the following quantities (% by weight, based on the additive mixture):

additive I: 5 to 100% by weight, preferably 25 to 99% by weight additive II: 0 to 80% by weight, preferably 9 to 50% by weight siccative: 0 to 20% by weight, preferably 0 to 12% by weight.

As can be seen from these figures, the additives (I) are generally used in the largest quantities. The non-migratable or substantially non-migratable additives (II) optionally used as auxiliaries are uniformly distributed in the polyolefin-based plastic during their incorporation. Accordingly, they are also present in the regions near the surface important for the immobilization of the migratable additive components (I). By virtue of their olefinically unsaturated elements, they are capable of reacting off with the additives (I). Preferred iodine values for the additives (II) according to the invention are in the range from about 50 to 150 and, more particularly, in the range from about 70 to 130.

The siccatives and/or other catalysts or initiators used in the preferred embodiments to fix and immobilize the additives (I) may be used in the comparatively very small quantities which correspond to expert knowledge on the catalytic induction of such reactions. As already mentioned, it has been found that the use of, for example, siccatives based on transition metals in concentrations well below the ppm range leads to effective immobilization of the additives (I) in the intended region, i.e. the uppermost layers of the solid plastic material.

The following observations relates to the character of the additives (I) or additive mixtures to be used in each individual case. The migration rate of these materials is very largely determined by their molecular structure. Linear or only lightly branched hydrocarbon residues, for example of the preferred range from about $C_{12}$ to $C_{36}$ and, more particularly, from about $C_{12}$ to $C_{24}$, migrate comparatively quickly so that optimum adhesion values are developed in a comparatively short time. For example, maximum adhesion levels can be determined after only about 1 to 3 days.

If, by contrast, additives or additive mixtures (I) of comparatively more complex and/or larger molecular structure, for example with up to 45 or 50 carbon atoms in the individual molecule, are used, the very much slower migration of such coupling additives is reflected in the fact that the potential adhesion levels to be determined rise over a considerable period of, for example, 2 to 3 weeks and only remain substantially constant thereafter. In their case, the coupling groups of high polarity evidently collect comparatively slowly on the outer surface of the polyolefin moldings and, in the subsequent coating step, are able to interact with the lacquer and/or the adhesive. A characteristic example of such a comparatively slowly migrating additive (I) are the balsam resins (Indonesian tree resin) based largely on abietic acid. Relevant numerical data can be found in the following Examples. The migration rate to be expected from the molecular structure of the particular additives (I) used can also be one of the determining factors for the particular quantity of additives (I) to be used in each individual case. Lower limits to the amount of additive (I) incorporated in the polyolefin are about 0.01% by weight and, more particularly, about 0.1% by weight. In general, it will be appropriate to use at least about 0.2 to 0.8% by weight, based on the weight of the oleophilic polyolefin. Optimal adhesion values for the representatives of additive class (I) used in each individual case are generally achieved with additions of about 1 to 5% by weight and, more particularly, up to about 3% by weight. However, it may even be appropriate to use the additive components (I) in even larger quantities, for example in quantities of up to about 10% by weight.

As already mentioned, the optimal adhesive strength to be established is understandably determined by the chemical nature and the possible interaction of the substituents of high polarity and, optionally, reactivity in the additive (I). The choice of the additives (I) to be used in each individual case is determined inter alia by the particular stresses likely to be applied to the bond between the polyolefin and the foreign material applied in the end product. In general, adhesion values (determined as tensile shear strength by the standard method described in the Examples) of at least about 1 $N/mm^2$ and preferably of at least 1.2 $N/mm^2$ can be achieved in accordance with the invention. In addition, it can be of advantage to establish adhesion values of at least 1.5 to 1.8 $N/mm^2$, adhesive strengths of at least 2.0 $N/mm^2$ being preferred for heavily stressed composite materials. According to the invention, adhesive strengths of this order can always be achieved by suitably selecting the coupling additives.

The numerical data in the Examples show that the immobilization of the additive component (I) in accordance with the invention is crucially important to the durability of the bonding effect. Although saturated carboxylic acids, for example of the stearic acid type or the even more effective corresponding linear carboxylic acids with slightly shorter hydrocarbon chains in the molecule, can lead to good adhesion levels in the short term, the strength of adhesion obtainable decreases continuously in the event of storage of correspondingly finished polyolefin solids. The situation is totally different with the coupling additives (I) immobilized in the boundary surface region in accordance with the invention. In their case, optimal adhesion levels once established are maintained for long periods or even increase in the event of prolonged storage.

The combination of adhesion levels increased in accordance with the invention with known technologies for improving strength of adhesion to polyolefin surfaces falls within the scope of the teaching according to the invention. Thus, both mechanical and chemical and/or physical surface treatments of the outer polyolefin surface can be combined with the modifications to adhesive strength achieved in accordance with the invention. However, this is generally not necessary.

The internal coupling additives and the siccatives or initiators optionally used may be incorporated in the polyolefin-based oleophilic solid material by methods known per se. Thus, it will generally be appropriate to pre-blend the additives with limited quantities of the polyolefin to form mixtures of relatively high concentration which can be presented, for example, as granules. The granules thus formed are subsequently incorporated in the polyolefins or polyolefin mixtures during their shape-creating processing, uniform incorporation being appropriate. Any initiators, siccatives and the like used may be correspondingly pre-blended in a separate step and added to the end products in the final mixing step.

The oleophilic polyolefin material may be selected from any of the numerous known polymer and copolymer types based on polyethylene or polypropylene, as described for example in the prior-art literature cited at the beginning. Mixtures of pure polyolefins with copolymers are also suitable in principle providing the migratability of the additives (I) according to the invention remains intact and their accumulation in the solid surfaces is thus guaranteed. Polymer types particularly suitable for the teaching according to the invention are listed below:

Poly(ethylenes) such as HDPE (high-density polyethylene), LDPE (low-density polyethylene), LLDPE (linear low-density polyethylene), MDPE (medium-density polyethylene), UHMPE (ultra high molecular polyethylene), VPE (crosslinked polyethylene), HPPE (high-pressure polyethylene); poly(styrene); poly(methylstyrene); poly(oxymethylene); metallocene catalyzed cycloolefin copolymers, such as norbornene/ethylene copolymers; copolymers containing at least 80% of ethylene and/or styrene and less than 20% of monomers, such as vinyl acetate, acrylates, methacrylates, acrylic acid, acrylonitrile, vinyl chloride. Examples of such polymers are poly(ethylene-co-ethyl acrylate), poly(ethylene-co-vinyl acetate), poly(ethylene-co-vinyl chloride), poly(styrene-co-acrylonitrile). Also suitable are graft copolymers and polymer blends, i.e. mixtures of polymers containing inter alia the polymers mentioned above, for example polyethylene-based polymer blends.

EXAMPLES

In the following Examples set out in tabular form, material samples produced under standardized conditions are subjected to standardized coating (with adhesives or lacquers) and the test materials thus produced are evaluated in standardized tests.

(A) Materials Used

In all the tests, the high molecular weight polyolefin used is a corresponding polyethylene of the LDPE type ("Lupolen H 1800", a product of BASF).

In the Tables, the auxiliaries used in each particular Example (relatively low molecular weight additive components (I), relatively high molecular weight additive components (II) and/or siccatives and optionally other additives— are assigned to each individual Example in terms of type and quantity and identified.

In each particular Example, additives of limited molecular weight, more particularly additives (I) according to the invention, are characterized either by their commercial names or by chemical identification. Where trade names (for example "Edenor SbO5") are used in the Tables, particulars of the chemical character of the additives in question can be found in the "Appendix to the Examples" which follows the Tables.

The relatively high molecular weight additives (II) are also characterized in the Tables by their commercial names (for example "Alkydal F681") or by reference to the resin types for "test 1" and "test 2" described in detail in the Appendix. All the particulars required for chemical identification can be found in the above-mentioned "Appendix to the Examples".

In the Examples, a mixture—described as "siccative" —of a cobalt, zirconium and lead octoate in toluene with a metal content of 1.04% by weight Co, 2.48% by weight Zr and 9.93% by weight Pb is used in almost every case as the catalytically active component for fixing the migratable additives (I).

Where other hardener components are used in individual Examples, they are identified in detail.

The polyurethane-based and epoxy-based reactive adhesives (Makroplast, Stabilit Ultra) used for bonding are identified by these commercial names in the Tables. A more detailed definition can again be found in the "Appendix to the Examples".

The same applies to the lacquers (lacquer I and lacquer II) used in the lacquering tests, of which the composition is again listed in the "Appendix to the Examples".

(B) Preparation of the Material Samples to be Tested

This is carried out as follows:

The mixtures listed in the Examples are produced by compounding in a Brabender Plasticorder PL 2000 twin-screw extruder with a screw diameter of 41.8 mm and a screw length of 7 D. The following temperatures are established in the heating zones: heating zone I 220° C., heating zone II 230° C., heating zone III 240° C. and slot die 250° C. The dimensions of the extrusion die are 50×0.5 mm so that a strip approximately 45 mm wide and 0.5 mm thick is formed. These strips were used for all the tests.

Bonding under standardized conditions is carried out as follows:

The two-component adhesives are stirred in non-reusable aluminium dishes and directly processed. The extruded PE strips are coated with adhesive over an area of 25×25 mm=625 mm$^2$ between two wooden spatulas so that two bonded areas are obtained between the spatulas and the PE strips. The wooden spatulas used have the following dimensions: length 10 cm, width 2.5 cm, thickness 0.2 cm.

Lacquering with the lacquers identified in the Examples is also carried out in known manner on the above-described PE strips.

(C) Testing of the Bonded or Lacquered Material Samples

This is carried out by the following generally accepted tests:

Determination of adhesive strength by tensile shear testing (DIN 53263) under the following standard conditions:

Tensile shear test: the tensile shear tests are carried out with a Zwick Universal testing machine. The test speed is 15 mm/minute. The values shown in the Tables where they are assigned to the particular mixtures represent averages of 5 individual measurements. The force measured on failure is determined (in N/mm$^2$).

To test lacquer adhesion, a lattice of 5×5=25 squares with an edge length of 1×1 mm is cut with a knife into the air-dried lacquer film of the particular material sample. A piece of Tesa film is then applied to the lattice, pressed on firmly with a finger nail and then suddenly peeled off.

The result is expressed as the number of square paint segments out of the 25 still adhering to the polyolefin surface. The larger this number, the better the adhesion of the lacquer layer to the polyethylene surface.

In addition to the auxiliaries incorporated ("mixture") and the quantities in which they are used (g), the number of days elapsing between extrusion of the polyethylene-based strip and bonding under standardized conditions is also shown in the following Tables. Any extraction treatment of the extruded strip additionally applied over this period is described in the particular individual case. The last column of the Example shows the adhesion values obtained in the above-described standard test where bonding is carried out with the polyurethane-based adhesive "Makroplast".

In a first series of tests, blank adhesion values are determined under the described standard conditions, the respective measurements being based on the polyethylene-based material samples identified in the following Table.

Blank Values:

| Material | Adhesive | Makroplast Fmax (N/mm$^2$) |
|---|---|---|
| Polyethylene (Lupolen H 1800) | Makroplast (PU adhesive) | 0.27 |
| Polyethylene (corona-treated) | Makroplast (PU adhesive) | 3.48 |
| Polyethylene (Lupolen H 1800) pickled with chromosulfuric acid | Makroplast (PU adhesive) | 2.35 |
| Wood/wood | Makroplast (PU adhesive) | 3.96 (pure cohesive failure) |

TABLE

| No. | Mixture | Quantity (g) | Bonded x days after extrusion | Makroplast Fmax (N/mm$^2$) |
|---|---|---|---|---|
| 1 | Edenor SbO5 Siccative | 9 0.19 | 1 | 3.32 |
| 2 | Edenor SbO5 Siccative | 9.0 0.38 | 1 7 (including 1 day's extraction with CH$_2$Cl$_2$) 31 (including 1 day's extraction with CH$_2$Cl$_2$) 31 (including 3 days' extraction with CH$_2$Cl$_2$) | 3.23 2.74 3.34 2.88 |
| 3 | Edenor FTi Siccative | 9.0 0.38 | 1 16 | 2.46 3.75 |
| 4 | Edenor UKD 6010 Siccative | 9.0 0.5 | 1 | 2.79 |
| 5 | Indonesian tree resin Siccative | 9.0 0.27 | 1 14 55 | 1.06 1.45 2.55 |
| 6 | Indonesian tree resin Edenor SbO5 Siccative | 6.3 2.7 0.19 | 2 50 63 | 1.13 2.10 2.09 |
| 7 | Indonesian tree resin Edenor SbO5 Siccative | 3.6 5.0 0.11 | 5 11 52 | 1.25 1.44 2.07 |
| 8 | Indonesian tree resin Edenor SbO5 Siccative | 2.7 6.3 0.08 | 6 48 | 1.53 2.02 |
| 9 | Dimer fatty acid Siccative | 9.0 0.38 | 3 | 2.69 |

Examples 1 to 4 use relatively quickly migrating additives (I) according to the invention with different contents of ethylenically unsaturated components (see Appendix). Examples 5 to 8 use the relatively slowly migrating indonesian tree resin based on abietic acid as additive (I) or as part of a mixture with the comparatively more quickly migrating additive based on the unsaturated fatty acid. In Example 9, C$_{36}$ dimer fatty acid (iodine value 136), which is characterized by two polar substituents on the oleophilic hydrocarbon molecule, is used as additive (I). Despite the comparatively large hydrocarbon molecule, a high bond strength value is measured.

Examples 10 to 16 below are intended to illustrate the characteristic element of the teaching according to the invention that even extremely small traces of the siccative lead to extremely effective immobilization of the additive (I).

| No. | Mixture | Quantity (g) | Bonded x days after extrusion | Makroplast Fmax (N/mm$^2$) |
|---|---|---|---|---|
| 10 | Edenor SbO5 Siccative | 9.0 0.25 | 1 | 2.62 |
| 11 | Edenor SbO5 Siccative | 9.0 0.1 | 1 | 2.56 |
| 12 | Edenor SbO5 Siccative | 9.0 0.01 | 1 | 2.63 |
| 13 | Edenor SbO5 Siccative | 9.0 0.005 | 1 | 2.45 |
| 14 | Edenor SbO5 Siccative | 9.0 0.001 | 1 | 3.06 |
| 15 | Edenor SbO5 Siccative | 9.0 0.0005 | 1 | 2.33 |
| 16 | Edenor SbO5 Siccative | 9.0 0.0002 | 1 | 2.86 |

Examples 17 to 24 below use mixtures of additives (I) with additives (II) as the additives according to the invention. On the one hand, the mixing ratios are varied; on the other hand, the particular types of additive (II) are varied. With regard to additive (I), a rapidly migrating type (Edenor SbO5) is compared with a comparatively slowly migrating type (Indonesian tree resin).

| No. | Mixture | Quantity (g) | Bonded x days after extrusion | Makroplast Fmax (N/mm$^2$) |
|---|---|---|---|---|
| 17 | Alkydal F681 (50%) Edenor SbO5 Siccative | 12.6 2.7 0.19 | 2 12 13 28 35 | 2.10 2.03 2.36 2.09 2.20 |
| 18 | Alkydal F681 (50%) Edenor SbO5 Siccative | 6.7 2.7 0.1 | 2 35 | 1.97 2.23 |
| 19 | Alkydal F681 (50%) Edenor SbO5 Siccative | 7.2 5.4 0.11 | 35 | 2.36 |
| 20 | Alkydal F681 (75%) Edenor SbO5 Siccative | 3.6 6.3 0.19 | 4 | 2.63 |
| 21 | Alkydal F681 (50%) Indonesian tree resin Siccative | 9.0 4.5 0.14 | 7 | 0.73 |
| 22 | Alkydal F681 (50%) Indonesian tree resin | 6.3 5.4 0.08 | 1 | 0.85 |
| 23 | Resin test 1 Edenor SbO5 Siccative | 2.7 6.3 0.19 | 1 11 (including 3 days' extraction in CH$_2$Cl$_2$) | 2.91 2.92 |
| 24 | Resin test 1 Edenor SbO5 Siccative | 6.3 2.7 0.19 | 4 | 0.51 |
| 25 | Alkydal R35 Edenor SbO5 Siccative Dhydril NRC | 8.25 4.1 0.15 0.03 | 1 | 0.98 |
| 26 | Alkydal R35 Edenor SbO5 Siccative Dehydril NRC | 6.0 5.4 0.108 0.02 | 1 | 1.55 |

In Examples 27 and 28, the migratable additive (I) is omitted from the polyethylene and only migration-inhibited additives (II) are added. The adhesion values determined are almost identical with the blank value shown above for pure polyethylene.

| No. | Mixture | Quantity (g) | Bonded × days after extrusion | Makroplast Fmax (N/mm$^2$) |
|---|---|---|---|---|
| 27 | Alkydal F681 (50%) Siccative | 9.5 0.29 | 2 36 | 0.23 0.32 |
| 28 | Alkydal R35 Siccative | 15.0 0.27 | 7 | 0.31 |

Examples 29 to 36 below modify the amount of additive (rapidly migrating and comparatively highly unsaturated additive (I)) added to a predetermined mixture and illustrate the dependence of the adhesion values obtainable. A significant reduction in the adhesion values only occurs at very low concentrations of the additive (I) in the polyethylene.

| No. | Mixture | Quantity (g) | Bonded × days after extrusion | Makroplast Fmax (N/mm$^2$) |
|---|---|---|---|---|
| 29 | Edenor SbO5 Siccative | 30.0 0.38 | 1 10 | 2.80 2.86 |
| 30 | Edenor SbO5 Siccative | 15.0 0.38 | 1 10 15 (2 days at 55° C.) | 2.44 2.92 2.43 |
| 31 | Edenor SbO5 Siccative | 6.0 0.38 | 1 10 | 2.66 3.17 |
| 32 | Edenor SbO5 Siccative | 3.0 0.38 | 1 10 | 2.19 2.16 |
| 33 | Edenor SbO5 Siccative | 1.2 0.38 | 1 10 | 1.75 2.84 |
| 34 | Edenor SbO5 Siccative | 0.5 0.38 | 1 | 1.77 |
| 35 | Edenor SbO5 Siccative | 0.1 0.38 | 1 | 1.18 |
| 36 | Edenor SbO5 Siccative | 0.01 0.38 | 1 | 0.67 |

Examples 37 to 43 below relate to the determination of adhesion values in the absence of the siccative using—on the one hand—rapidly or even relatively slowly migrating additives (I), which can be permanently fixed in the surface of the polyethylene material in the context of the definition according to the invention, and—on the other hand (for comparison)—saturated carboxylic acids of the stearic acid, isostearic acid and capric acid type as additives. In this case, the additive cannot of course be fixed by oxidation.

The Table shows the adhesive strength values as a function of the time lapsing between production of the polyethylene-based strip and its bonding under the standardized conditions defined above.

| No. | Mixture | Quantity (g) | Bonded × days after extrusion | Makroplast Fmax (N/mm$^2$) |
|---|---|---|---|---|
| 37 | Edenor SbO5 | 9.0 | 1 6 21 25 (3 days' extraction in CH$_2$Cl$_2$) 26 40 | 1.82 2.21 2.78 2.73 2.96 2.68 |
| 38 | Indonesian tree resin | 9.0 | 8 11 67 | 0.33 0.40 0.56 |
| 39 | Dimer fatty acid | 9.45 | 3 | 2.68 |
| 40 | Stearic acid | 9.0 | 1 2 7 20 | 1.26 0.90 0.86 0.63 |
| 41 | Isostearic acid | 6.0 | 1 7 19 | 1.82 1.22 1.19 |
| 42 | Isostearic acid | 15.0 | 1 7 7 (2 days at 55° C.) 19 | 2.44 2.13 1.89 1.93 |
| 43 | Capric acid (C10) | 9.0 | 1 3 7 21 | 2.28 1.83 1.59 1.40 |

The considerable loss of adhesion with increasing time interval between production of the plastic strip and its bonding under standard conditions where the saturated fatty acids are used as additive (I) is striking.

Comparable results are obtained where fully saturated, rapidly migrating additives of the capric acid and isostearic acid type are added, even in the presence of the siccative, see Examples 44 to 49 below.

| No. | Mixture | Quantity (g) | Bonded × days after extrusion | Makroplast Fmax (N/mm$^2$) |
|---|---|---|---|---|
| 44 | Capric acid Siccative | 9.0 0.38 | 3 15 | 1.75 0.99 |
| 45 | Isostearic acid Siccative | 1.2 0.38 | 1 7 19 | 1.12 0.92 0.72 |
| 46 | Isostearic acid Siccative | 3.0 0.38 | 1 7 19 | 1.46 1.06 0.83 |
| 47 | Isostearic acid Siccative | 6.0 0.38 | 1 7 19 | 1.95 1.30 0.99 |
| 48 | Isostearic acid Siccative | 9.0 0.38 | 1 15 | 2.36 1.42 |
| 49 | Isostearic acid Siccative | 15.0 0.38 | 1 7 19 | 2.28 1.68 1.62 |

Further variations of the teaching according to the invention are given in Examples 50 to 52 below. In Example 50, a carboxylic acid methyl ester group is used as the coupling functional group. Although the adhesion values obtainable are lower by comparison with the carboxyl group, they are still far higher than the blank value.

Examples 51 and 52 use a cobalt salt (cf. "test 3" below) and iron salt of an ether carboxylic acid instead of the "siccative" defined above.

| No. | Mixture | Quantity (g) | Bonded × days after extrusion | Makroplast Fmax (N/mm$^2$) |
|---|---|---|---|---|
| 50 | Edenor MeTiO5 Siccative | 9.0 0.38 | 1 10 | 0.53 0.93 |
| 51 | Ether carboxylic acid, Co salt from test 3 | 1.8 | 5 25 (incl. 3 days' extraction with | 2.42 1.95 2.00 |

-continued

| No. | Mixture | Quantity (g) | Bonded x days after extrusion | Makroplast Fmax (N/mm²) |
|---|---|---|---|---|
| 52 | Ether carboxylic acid, Fe salt from test 3 | 1.8 | CH₂Cl₂) 1 | 1.87 |

The following Table covering examples 53 to 63 shows the result of a comparison of various functional groups in the additive (I) for adhesion to polythylene. The adhesives used for bonding are an epoxy adhesive (Stabilit Ultra) and the previously used polyurethane adhesive (Makroplast).

Comparison of various functional groups for adhesion to PE

| No. | 9 g of Substance to 600 g of polyethylene | Epoxy adhesive (Stabilit Ultra) No siccative (N/mm²) | Epoxy adhesive (Stabilit Ultra) +0.38 g siccative/600 g polyethylene (N/mm²) | PU adhesive (Makroplast) No siccative (N/mm²) | PU adhesive (Makroplast) +0.38 g siccative/600 g polyethylene (N/mm²) |
|---|---|---|---|---|---|
| 53 | Soya alkyl oxazoline | 0.85 | 1.04 | 0.54 | 2.26 |
| 54 | Stearic acid amide | 0.74 | 0.56 | 0.91 | 0.71 |
| 55 | Erucic acid amide | — | 1.05 | 0.31 | 1.53 |
| 56 | Oleic acid amide | 0.68 | 1.76 | 0.26 | 1.69 |
| 57 | HD Ocenol 150/170 | 1.38 | 1.49 | 0.40 | 1.31 |
| 58 | Glycerol monooleate | 0.63 | 2.01 | 0.31 | 1.53 |
| 59 | Sorbitan monooleate | 0.63 | 3.54 | 0.32 | 2.72 |
| 60 | Edenor SbO5 | — | 1.35 | 1.82 | 3.3 |
| 61 | Edenor MeTiO5 | — | — | 0.2 | 0.53 |
| 62 | C₁₆ Alkenyl-SM | — | — | 0.35 | 0.37 |
| 63 | Oleic acid diethanolamide | 3.32 | 2.52 | 2.41 | 2.26 |

Lacquer Adhesion Tests

The adhesion of lacquer layers to the surface of untreated polyethylene, siccative-containing polyethylene and polyethylene mixtures modified in accordance with the invention is investigated in a series of further tests. The procedure adopted is the same as described in detail at the beginning of the Examples under section (C) (cross-hatching with 25 1×1 mm squares).

Lacquers I (polyurethane-based) and II (acrylic resin/polyurethane-based) are used. Further particulars of these lacquers can be found in the Appendix to the Examples.

The particular materials used and the lacquering results obtained are set out in the following Table. In every case, the lacquer was applied about 1 week after preparation of the particular polyethylene-based multicomponent mixture. Regular measurement of the adhesion of materials selected at random does not show any deterioration in the paint adhesion values, even after storage for 6 weeks at 60° C.

| Mixture | Quantity in 600 g PE (g) | Lacquer I Squares remaining mm² (multiple measurement) | Lacquer II Squares remaining mm² (multiple measurement) |
|---|---|---|---|
| Pure polyethylene (Lupolen H1800) | 0.19 | 0 0 | 0 0 |
| Siccative | 0.19 | 0 0 0 | 0 |

-continued

| Mixture | Quantity in 600 g PE (g) | Lacquer I Squares remaining mm² (multiple measurement) | Lacquer II Squares remaining mm² (multiple measurement) |
|---|---|---|---|
| Edenor SbO5 | 9.0 | 25 25 | 25 25 |
| Edenor SbO5 | 9.0 | 23 2 22 | 25 25 |
| Siccative | 0.19 | | |
| Edenor SbO5 | 9.0 | 25 25 24 | 25 25 25 |
| Siccative | 0.38 | | |
| Edenor SbO5 | 9.0 | 25 25 25 | 25 25 |
| Siccative | 1.0 | | |
| Edenor SbO5 | 1.2 | n.d. | 25 24 25 |

-continued

| Mixture | Quantity in 600 g PE (g) | Lacquer I Squares remaining mm² (multiple measurement) | Lacquer II Squares remaining mm² (multiple measurement) |
|---|---|---|---|
| Siccative | 0.38 | | |
| Edenor SbO5 | 9.0 | n.d. | 25 25 25 |
| Siccative | 0.005 | | |
| Indonesion tree resin | 9.0 | n.d. | 25 25 25 |
| Siccative | 0.27 | | |
| Indonesian tree resin | 5.9 | 25 25 25 | 25 25 |
| Edenor SbO5 | 3.6 | | |
| Siccative | 0.19 | | |
| Alkydal F681 (50%) | 12.6 | n.d. | 25 25 |
| Edenor SbO5 | 2.7 | | |
| Siccative | 0.19 | | |

Identification of Chemicals

As mentioned at the beginning of the Examples, further particulars of the chemical characteristics of individual additives (I), additives (II), adhesives and lacquers I and II used in the Examples are set out in the following Appendix.

| Individual chemicals: | |
| --- | --- |
| Dehydril NRC: | anti-skinning agent (a product of Henkel KGaA) |
| Oleic acid diethanolamide: | commerical product ("Comperian OD", a product of Henkel KGaA), used in Example 63 |
| HD-Ocenol 150/170: | unsaturated fatty alcohol with an iodine value of 150 to 170 (a product of Henkel KGaA). |
| Additive (I): | |
| Edenor SbO5: | polyunsaturated $C_{18}$ fatty acid with an iodine value of 135 to 145 |
| Edenor UKD 6010: | highly unsaturated $C_{18}$ fatty acid with an iodine value of 140–148 (content of $C_{18}$ "conjugated fatty acids 58 to 62% by weight) |
| Edenor FTi: | $C_{14-18}$ fatty acids with an iodine value of 48 to 54 ($C_{18}$' 40% by weight) |
| Edenor TiO5: | predominantly unsaturated $C_{16/18}$ fatty acid with an iodine value of 89 to 97 |
| Edenor MeTiO5: | methyl ester of predominantly unsaturated $C_{16/18}$ fatty acids with iodine values of 89 to 97 |

All the Edenor fatty acid types mentioned here are commercial products of Henkel KGaA which are described in the relevant scientific literature under the protected trade names mentioned.

| Additive (II): | |
| --- | --- |
| Alkydal F681: | a product of Bayer AG, long-oil alkyd resin which is used, for example, as an artist's paint and which contains 66% of drying vegetable fatty acids, acid value >20 |
| Alkydal R35: | a product of Bayer AG, a universal resin for industrial primers and finishing lacquers based on a short-oil alkyd resin with a content of about 32% castor oil, acid value 18 to 25 |

Additive (II) for "Test 1"

A mixture of 334 g of methyl acrylate, 208 g of styrene and 8.1 g of dicumyl peroxide is slowly added dropwise (7 h) to 650 g of hexanol at a reaction temperature of 135° C. 650 g of HD Ocenol 150/170 are then added. The hexanol is distilled off. 3.4 g of an organotin catalyst ("Swedcat 5" a product of Swedstab) are then added at 180° C. Methanol separates at 180° C. The reaction is terminated when methanol stops separating. A resin highly viscous at room temperature is obtained. Yield 1129.6 g, OH value 7.7, acid value 0.5, saponification value 156, iodine value 94.

Additive (II) for "Test 2":

29.1 g of diethylene glycol, 22.4 g of maleic anhydride and 0.1 g of p-toluene sulfonic anhydride are introduced into a reaction vessel and stirred. The reaction vessel is then evacuated and purged with nitrogen three times. The reaction mixture is heated to 140° C. and, after a reaction time of 1 h, the temperature is increased to 160° C. and water is removed until the acid value is <8. The polyester obtained has a melt viscosity of 120 to 160 mPas (100° C., 2500 s$^{-1}$) and an iodine value of 136.

The Reactive Adhesives Used for Bonding:

Makroplast, polyurethane adhesive (a product of Henkel KGaA) consisting of the resin component known commercially as UK 8109 and the hardener component UK 5430 in a ratio of 5:1. The hardener contains diphenylmethane-4,4'-diisocyanate; pot life about 1 hour.

Stabilit Ultra, epoxy adhesive (a product of Henkel KGaA) consisting of epoxy resin (Metallon E2108) and diamine hardener in a ratio of 10:6, pot life about 30 minutes.

The Lacquers Used for Surface Lacquering:

Lacquer I (polyurethane lacquer):
  2.60 g of a trifunctional aromatic isocyanate (Desmodur L75 K)
  1.55 g of a polyol (Desmophen 800)
  3.00 g of methyl ethyl ketone Lacquer II (combination lacquer based on polyurethane/acrylic resin):
  5 g G-Cure 105P70 (acrylic polyol resin)
  1.17 g of a trifunctional aliphatic isocyanate (Desmodur N 100)
  5.0 g of methyl ethyl ketone Additive (I) in the Form of the Co or Fe Salt of an Unsaturated Ether Carboxylic Acid for "Test 3":

231.4 g of HD Ocenol 150/170×10 EO ether carboxylic acid are reacted with 24.9 g of Co(II) acetate×4H$_2$O (dissolved in 80 ml of H$_2$O) in 150 ml of xylene with elimination of water and acetic acid. A water-soluble Co soap is obtained. The Fe soap is prepared in the same way. The additives thus prepared were used in Examples 51 and 52.

The ether carboxylic acid used was conventionally prepared as follows: 10 moles of ethylene oxide were added to the unsaturated fatty alcohol HD Ocenol 150/170 (definition see above). The adduct was converted into its Na salt with NaOH and then reacted with chloroacetic acid to form the ether carboxylic acid.

What is claimed is:

1. A process for permanently improving surfaces of polyolefin-based moldings and films for bonding with coatings and adhesives, comprising the steps of:
    (a) molding a composition comprising at least one polyolefin, about 0.01 to about 10% by weight, based on the polyolefin of at least one migratable, crosslinkable amphiphile compound containing at least one substituent of high polarity in an otherwise hydrocarbon-based basic molecule having a molecular weight of about 50 to about 5,000 Dalton and a catalytically effective amount of a catalyst which promotes crosslinking of the crosslinkable amphiphile compound in the plastic surface to form a polyolefin-based molding or film;
    (b) allowing said crosslinkable amphiphile compound to migrate to the surface of said polyolefin-based molding or film and crosslink.

2. The process claimed in claim 1, wherein a tensile shear strength of at least about 1.2 N/mm$^2$ is obtained when a polyurethane adhesive is applied to a surface of said polyolefin-based molding or film, as determined on a Zwick Universal testing machine at test speeds of 15 mm/min.

3. The process of claim 1, wherein the at least one migratable amphiphile compound has an iodine value of about 10 to about 200.

4. The process of claim 1, wherein the at least one migratable amphiphile compound substituent of high polarity comprises a group selected from the group consisting of carboxyl, hydroxyl, amino, oxazoline, epoxy, isocyanate and mixtures thereof.

5. The process of claim 1, wherein the catalyst comprises a transition metal and the transition metal content of the polyolefin molding or film is less than 5 ppm.

6. The process of claim 5, wherein the transition metals comprise salts of carboxylic acids.

7. The process of claim 1, wherein the transition metal content of the polyolefin, molding or film is less than about 1 ppm.

8. A polyolefin-based molding or film comprising a surface, produced by the process of claim 1.

9. The process of claim 1, wherein the migratable amphiphile compound is oleophilic and comprises olefinically unsaturated hydrocarbon residues that have a linear, branced and/or cyclic structure and are liquid at room temperature.

10. The process of claim 1, wherein the migratable, crosslinkable, amphiphile compound comprises a group containing a hetero atom as the substituent of high polarity.

11. The process of claim 10, wherein the hetero atom is selected from the group consisting of O,N, halogen and mixtures thereof.

12. The process of claim 1, wherein the quantities of catalyst used are limited to such an extent that there is no degradation of the polyolefin after 14 days in an atmosphere of at least about 80% relative humidity at a temperature of 60° C.

13. The process of claim 1, wherein the migratable amphiphile compound is a mixture of monounsaturated carboxylic acid and at least about 50% polyolefinically unsaturated carboxylic acid.

14. The process of claim 13, wherein the carboxylic acids contain at least about 12 carbon atoms.

15. The process of claim 1, wherein the migratable amphiphile compound comprises olefinic double bonds.

16. The process of claim 1, wherein the migratable amphiphile compound is liquid at room temperature.

17. The process of claim 1, wherein the migratable amphiphile compound comprises branched hydrocarbon residues.

18. The process of claim 17, wherein the branched hydrocarbon residues comprise tertiary carbon atoms.

19. The process of claim 1, wherein the migratable amphiphile compound comprises multiple olefinic double bonds.

* * * * *